United States Patent
Callahan

(10) Patent No.: US 9,599,008 B2
(45) Date of Patent: Mar. 21, 2017

(54) THERMAL ISOLATION DISC FOR SILENCER

(71) Applicant: Faurecia Emissions Control Technologies USA, LLC, Columbus, IN (US)

(72) Inventor: Joseph E. Callahan, Greenwood, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 0 days.

(21) Appl. No.: 14/760,029

(22) PCT Filed: Jan. 3, 2014

(86) PCT No.: PCT/US2014/010130
§ 371 (c)(1),
(2) Date: Jul. 9, 2015

(87) PCT Pub. No.: WO2014/109950
PCT Pub. Date: Jul. 17, 2014

(65) Prior Publication Data
US 2015/0337713 A1    Nov. 26, 2015

Related U.S. Application Data

(60) Provisional application No. 61/750,908, filed on Jan. 10, 2013.

(51) Int. Cl.
*F01N 13/14* (2010.01)
*F01N 13/18* (2010.01)
(Continued)

(52) U.S. Cl.
CPC ......... *F01N 13/1805* (2013.01); *F01N 13/08* (2013.01); *F01N 13/082* (2013.01);
(Continued)

(58) Field of Classification Search
CPC ...... F01N 13/14; F01N 13/082; F01N 13/141; F01N 13/148
(Continued)

(56) References Cited

U.S. PATENT DOCUMENTS 1,752,038 A  *  3/1930  Sunday ............. B60H 1/00335
                                                165/51
2,835,360 A  *  5/1958  Bernardoni ......... E06B 3/26301
                                                285/223
(Continued)

FOREIGN PATENT DOCUMENTS

CN    201354668 Y      12/2009
JP    60156922 A   *   8/1985
JP    04342820 A   *   11/1992

OTHER PUBLICATIONS

Search Report from corresponding PCT application, PCT/US2014/010130, dated Apr. 14, 2014.
(Continued)

*Primary Examiner* — Edgardo San Martin
(74) *Attorney, Agent, or Firm* — Carlson, Gaskey & Olds, PC

(57) ABSTRACT

A thermal isolation disc for an exhaust silencer includes a first ring configured for attachment to an exhaust pipe defining a center axis, a second ring configured for attachment to a composite outer housing of a silencer, and a gasket sandwiched between the first and second rings.

10 Claims, 2 Drawing Sheets

(51) Int. Cl.
    *F01N 13/08*     (2010.01)
    *F16J 15/06*     (2006.01)
    *F01N 13/00*     (2010.01)

(52) U.S. Cl.
    CPC ............ *F01N 13/14* (2013.01); *F16J 15/061* (2013.01); *F16J 15/065* (2013.01)

(58) Field of Classification Search
    USPC ........... 181/228, 227, 246, 264; 285/49, 299
    See application file for complete search history.

(56) References Cited

U.S. PATENT DOCUMENTS

| | | | | |
|---|---|---|---|---|
| 3,246,917 | A * | 4/1966 | Martin | F16L 7/02 138/148 |
| 3,692,335 | A * | 9/1972 | Vickers | F02F 7/006 181/200 |
| 4,073,361 | A | 2/1978 | Murota et al. | |
| 4,197,826 | A | 4/1980 | Fachbach et al. | |
| 4,239,091 | A * | 12/1980 | Negrao | F01N 1/24 181/243 |
| 4,432,943 | A * | 2/1984 | Musall | B01J 35/02 422/179 |
| 4,659,117 | A * | 4/1987 | Holzhausen | F16L 27/1021 180/309 |
| 4,880,078 | A * | 11/1989 | Inoue | F01N 1/02 181/217 |
| 4,988,268 | A * | 1/1991 | Kurihara | F04B 39/0061 181/246 |
| 4,993,513 | A * | 2/1991 | Inoue | F01N 1/24 181/228 |
| 5,211,013 | A * | 5/1993 | Bonde | F01N 13/002 181/240 |
| 5,266,755 | A | 11/1993 | Chien | |
| 5,321,214 | A * | 6/1994 | Uegane | B60K 13/04 181/211 |
| 5,336,856 | A * | 8/1994 | Krider | F01N 1/065 181/206 |
| 5,482,330 | A * | 1/1996 | Holzhausen | F16L 27/11 285/226 |
| 5,639,127 | A * | 6/1997 | Davey | F01N 13/1811 285/226 |
| 5,992,896 | A * | 11/1999 | Davey | F01N 13/1811 285/226 |
| 6,299,214 | B1 * | 10/2001 | Li | F04C 29/00 285/48 |
| 6,354,632 | B1 * | 3/2002 | Jung | F01N 13/1811 285/226 |
| 6,543,575 | B1 * | 4/2003 | Marcellus | F16L 39/005 137/312 |
| 6,668,972 | B2 * | 12/2003 | Huff | B60K 13/04 181/228 |
| 7,032,702 | B2 * | 4/2006 | Rinklin | B60K 13/04 180/309 |
| 7,325,652 | B2 * | 2/2008 | Huff | B60R 19/48 181/209 |
| 7,434,656 | B2 * | 10/2008 | Yasuda | F01N 1/24 181/207 |
| 7,458,440 | B2 * | 12/2008 | Uegane | F01N 13/08 181/209 |
| 7,730,996 | B2 * | 6/2010 | Van De Flier | B60K 13/04 181/246 |
| 7,810,609 | B2 * | 10/2010 | Sikes | F01N 1/24 181/246 |
| 7,934,580 | B2 * | 5/2011 | Van de Flier | B60K 13/04 181/246 |
| 8,151,932 | B2 * | 4/2012 | Inoue | F01N 13/08 181/227 |
| 8,196,702 | B2 * | 6/2012 | Park | F01N 1/04 181/239 |
| 8,230,968 | B2 * | 7/2012 | Jung | F04B 39/123 181/212 |
| 8,322,134 | B2 * | 12/2012 | Wieland | F01N 3/035 181/227 |
| 8,485,314 | B2 * | 7/2013 | Danner | F01N 1/026 181/246 |
| 8,490,745 | B2 * | 7/2013 | Wirth | F01N 13/16 181/212 |
| 8,500,172 | B2 * | 8/2013 | Turfait | F01N 13/1816 285/226 |
| 8,505,682 | B2 * | 8/2013 | Jones | F01N 1/006 181/246 |
| 8,672,090 | B1 * | 3/2014 | Abram | F01N 13/14 181/212 |
| 8,800,713 | B2 * | 8/2014 | Keesser | F01N 1/023 181/246 |
| 2009/0194364 | A1 * | 8/2009 | Leboeuf | F01N 1/24 181/247 |
| 2012/0273301 | A1 * | 11/2012 | Jones | F01N 1/006 181/228 |

OTHER PUBLICATIONS

International Preliminary Report on Patentability from corresponding PCT application, PCT/US2014/010130, dated Jul. 23, 2015.

\* cited by examiner

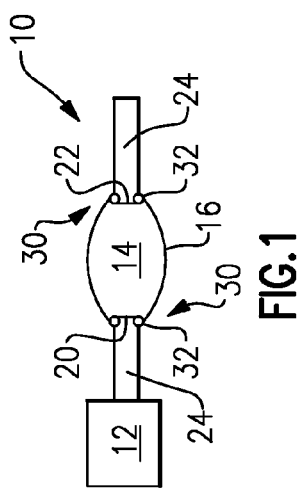
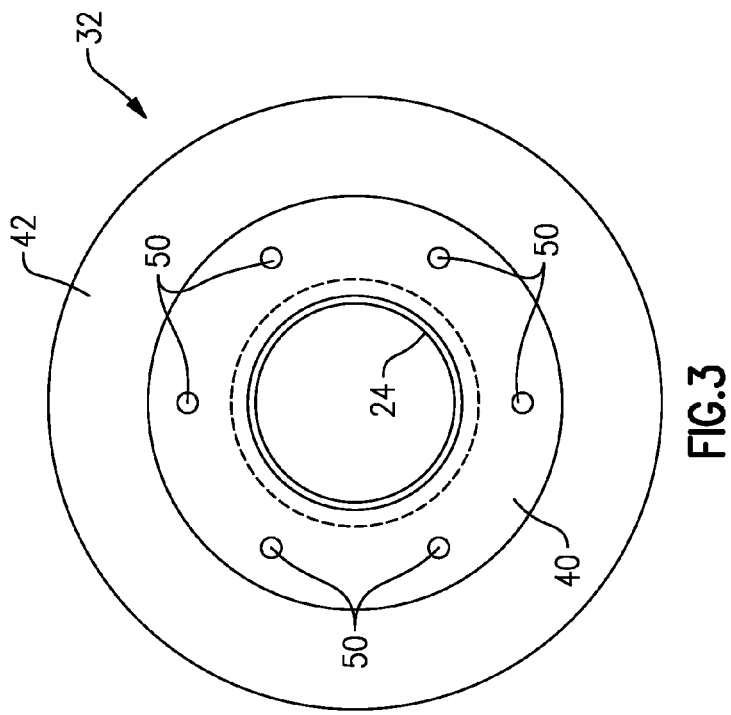
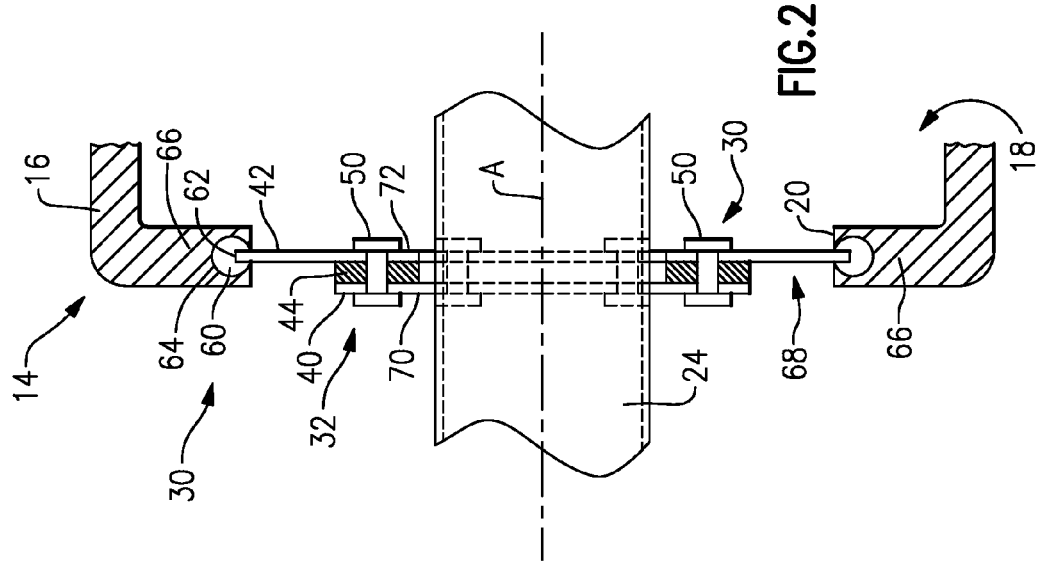

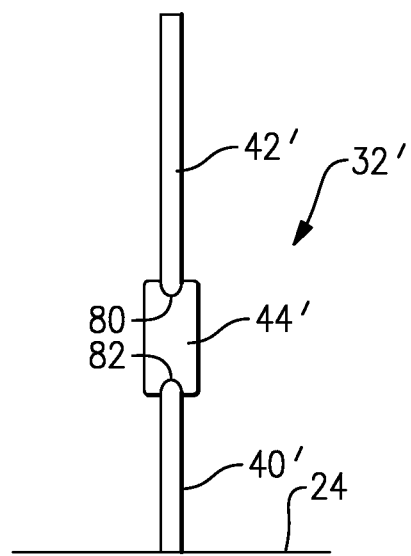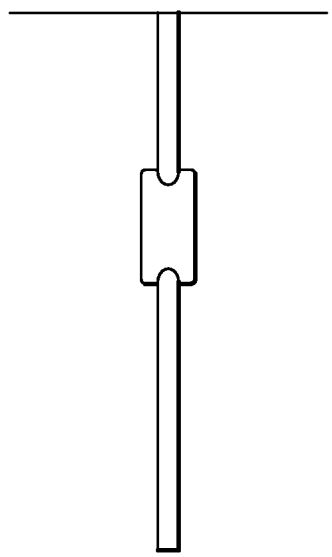
FIG.4

THERMAL ISOLATION DISC FOR SILENCER

RELATED APPLICATION

This application claims priority to U.S. Provisional Application Ser. No. 61/750,908, filed Jan. 10, 2013.

TECHNICAL FIELD

This invention generally relates to a thermal isolation disc for a silencer as used in an exhaust system.

BACKGROUND

Exhaust systems often include mufflers or silencers to reduce undesirable noise generated by the exhaust system. Silencers typically include an outer housing through which an exhaust pipe extends from an inlet to an outlet. Acoustic material, such as fiberglass for example, can surround the exhaust pipe and fill an interior cavity of the outer housing to provide desired noise reduction. Optionally, the exhaust pipe can be formed to include perforations in fluid communication with the interior cavity of the outer housing to provide the desired noise reduction.

The exhaust pipes are subjected to high exhaust gas temperatures. In order to provide a weight savings, the outer housing of the silencers can be made from composite materials; however, under certain operating conditions the exhaust gas temperatures may exceed the melting temperature of the composite outer housing. One proposed solution has been to use a thermal isolation disc at the connection interface between the outer housing and the exhaust pipe. Current thermal isolation discs use distance from the heat source to keep the temperature at the interface between the composite material and steel material of the exhaust pipe below the material limits of the composite material. This is done by increasing an outer diameter of the disc until the distance between an inner diameter and the outer diameter is sufficient such that heat at the outer diameter is below the composite material limit. Optionally, an axially extending, cone-shaped disc has been used to connect the exhaust pipe to the outer housing. Both of these configuration are disadvantageous due to the need for larger areas or lengths to accommodate the enlarged diameter or the length of the cone.

SUMMARY

In one exemplary embodiment, a thermal isolation disc for an exhaust silencer includes a first ring configured for attachment to an exhaust pipe defining a center axis, a second ring configured for attachment to a composite outer housing of a silencer, an a gasket sandwiched between the first and second rings.

In a further embodiment of the above, the first and/or second rings are comprised of steel.

In a further embodiment of any of the above, the gasket is comprised of an insulating material.

In a further embodiment of any of the above, the disc includes a thermal isolation ring mounted to an outer periphery of the second ring.

In a further embodiment of any of the above, the first and second rings are axially separated from each other by the gasket.

In a further embodiment of any of the above, portions of the first and second discs overlap each other in a radial direction.

In a further embodiment of any of the above, an inner peripheral edge of the second ring is radially separated from an outer peripheral edge of the first ring by the gasket.

In another exemplary embodiment, a silencer for an exhaust system includes an outer housing comprised of a composite material, an exhaust pipe mounted to the outer housing at an attachment interface, the exhaust pipe defining a center axis, and a thermal isolation disc positioned between the outer housing and exhaust pipe at the attachment interface. The thermal isolation disc includes a first ring attached to the exhaust pipe, a second ring attached to the outer housing, and a gasket sandwiched between the first and second rings.

In a further embodiment of any of the above, the thermal isolation disc includes at least one fastener that secures the first ring, second ring, and gasket together.

The foregoing features and elements may be combined in any combination without exclusivity, unless expressly indicated otherwise.

BRIEF DESCRIPTION OF THE DRAWINGS

FIG. 1 is a schematic view of a vehicle exhaust system incorporating the subject invention.

FIG. 2 is a second view of a thermal isolation disc used to connect a pipe to an exhaust component.

FIG. 3 is an end view of the thermal isolation disc of FIG. 2.

FIG. 4 is a schematic view of another example of a thermal isolation disc.

DETAILED DESCRIPTION

FIG. 1 shows an exhaust system 10 with an internal combustion engine 12 that generates exhaust gases that are transmitted downstream to one or more exhaust components, such as a muffler or silencer 14. The silencer 14 is comprised of an outer housing 16 defining an interior cavity 18 (FIG. 2) and which includes an inlet 20 and an outlet 22.

As shown in FIG. 2, at least one exhaust pipe 24 is associated with the silencer 14. The exhaust pipe 24 defines a central axis A and can be comprised of a single pipe that extends from the inlet 20 to the outlet 24, or the exhaust pipe 24 can be comprised of multiple pieces connected to each other with at least one piece being associated with the outlet and another piece being associated with the inlet. The exhaust pipe 24 is mounted to the outer housing 16 at an attachment interface 30. A thermal isolation disc 32 is positioned between the outer housing 16 and the exhaust pipe 24 at the attachment interface 30. In one example, the attachment interface 30 is located at the inlet 20 and outlet 22 of the outer housing 16; however, the thermal isolation disc 32 may only be used at one of the inlet 20 or outlet 22 as needed.

The outer housing 16 of the muffler 14 is comprised of a composite material that includes a resin material with reinforcing fibers. Any type of resin material and any type of fiber material can be used as long as the materials are sufficient to meet the specified temperature levels for the exhaust system 10. Using a composite material for the muffler 14 provides a significant overall weight reduction for the exhaust system 10.

In one example, the exhaust pipe 24 is comprised of a steel material. The exhaust pipe 24 can be attached to the thermal isolation disc 32 using any of various attachment methods such as welding, brazing, adhesive, fasteners, clamps, etc.

The thermal isolation disc 32 provides a reduction in heat transfer from the exhaust pipe, which is subjected to high temperature exhaust gases, to the outer housing 16, which is made from the composite material having a melting temperature that is less than that of the exhaust pipe 24. The thermal isolation disc 32 is comprised of a first disc or ring 40 that is attached to the exhaust pipe 24, a second disc or ring 42 that is attached to the outer housing 16, and a gasket 44 that is sandwiched between the first 40 and second 42 rings. The sandwich creates a thermal discontinuity which keeps the majority of the conduction energy passing through the thermal isolation disc 32 and lowering the temperature at an outer peripheral edge of the disc.

In one example, the first 40 and second 42 rings are comprised of a steel material and the gasket 44 is comprised of an insulating material. The first ring 40 can be fixed to the exhaust pipe 24 by any of various attachment methods including welding, brazing, clamps, etc.

In one example, one or more fasteners 50 are used to secure the first ring 40, second ring 42, and gasket 44 together. The fasteners 50 can be bolts, rivets, screws, or some form of metal displacement joint, for example. The fasteners 50 compress the gasket 44 between the rings 40, 42.

In one example, a thermal isolation ring 60 is mounted to an outer peripheral edge 62 of the second ring 42. The thermal isolation ring 60 fits in a groove 64 that is formed in the outer housing 16. The housing 16 includes radially inwardly extending portions 66 that face each other and which are separated from each other by a gap 68 that defines the inlet 20 as shown in FIG. 2. The groove 64 is formed in a distal end face of the radially inwardly extending portions 66. The thermal isolation ring 60 is pressed into the groove 64 and surrounds the inlet opening. In one example, the thermal isolation ring 60 is comprised of a silicon material.

In the example shown, the outer peripheral edge 62 of the second ring 42 is pressed into an inner peripheral surface of the thermal isolation ring 60. The second ring 42 can then be further secured to the housing 16 if needed by any of various attachment methods such as adhesive, for example.

In the embodiment shown in FIGS. 2-3, the first 40 and second 42 rings are axially separated from each other by the gasket 44. As such, portions 70, 72 respectively of the first 40 and second 42 discs overlap each other in a radial direction. In other words, the outer peripheral portion 70 of the inner ring 40 overlaps the inner peripheral portion 72 of the outer ring 42. These portions 70, 72 also face each other in an axial direction, but are separated from each other by the gasket 44.

In the example of FIG. 4, a thermal isolation disc 32' uses concentric surfaces of the rings 40', 42' to capture the gasket 44' between them. As such, an inner peripheral edge 80 of the second ring 42' is radially separated from an outer peripheral edge 82 of the first ring 40' by the gasket 44'. The gasket 44' can be further secured to the rings 40', 42' if needed by any of various attachment methods such as adhesive, for example. The first or inner ring 40' can be fixed to the exhaust pipe 24 by any of various attachment methods such as welding, brazing, etc. The second ring 42' can then be further secured to the housing 16 if needed by any of various attachment methods such as adhesive, for example.

The use of a composite housing in combination with a thermal isolation disc to mount the inlet and outlet pipes provides a compact and lightweight exhaust component. The composite material significantly reduces weight as compared to prior steel housing configurations. Further, the subject thermal isolation disc allows the use of the composite material housing without significantly increasing the overall size of the connection interfaces for the inlet and outlet pipes, i.e. the packaging space is not adversely affected.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A silencer for an exhaust system comprising:
   an outer housing comprised of a composite material, the outer housing defining an interior cavity extending from an inlet to an outlet;
   an exhaust pipe mounted to the outer housing at an attachment interface, the exhaust pipe defining a center axis configured to conduct engine exhaust gases into the interior cavity of the outer housing;
   a thermal isolation disc positioned between the outer housing and exhaust pipe at the attachment interface, the thermal isolation disc comprising a first ring attached to the exhaust pipe, a second ring attached to the outer housing, and a gasket sandwiched between the first and second rings; and
   a thermal isolation ring separate from the gasket and mounted to an outer periphery of the second ring, and wherein the inlet of the outer housing is defined by a radially inwardly extending portion, and wherein the thermal isolation ring is received within a grooved formed within the radially inwardly extending portion such that an outer peripheral edge of the second ring abuts directly against the thermal isolation ring.

2. The silencer according to claim 1 wherein the gasket is comprised of an insulating material and the first and second rings are comprised of a steel material.

3. The silencer according to claim 1 wherein the first and second rings are axially separated from each other by the gasket.

4. The silencer according to claim 1 wherein the gasket has an outer peripheral gasket edge and an inner peripheral gasket edge surrounding the center axis, and wherein an inner peripheral edge of the second ring engages the outer peripheral gasket edge and is radially separated from an outer peripheral edge of the first ring which engages the inner peripheral gasket edge.

5. The silencer according to claim 1 wherein at least one of the first and second rings are comprised of steel.

6. The silencer according to claim 1 wherein the gasket is comprised of an insulating material.

7. The silencer according to claim 1 wherein the thermal isolation disc includes at least one fastener that secures the first ring, second ring, and gasket together.

8. The silencer according to claim 1 wherein the composite material comprises a combination of a least a first type of material and a second type of material that reinforces the first type of material.

9. The silencer according to claim 8 wherein the first type of material comprises a resin and a second type of material comprises fibers.

10. The silencer according to claim 1 wherein the first ring is defined by a first outermost diameter, the second ring is defined by a second outermost diameter that is greater than the first outermost diameter, and the gasket is defined by a third outermost diameter that is less than the second outermost diameter.

* * * * *

UNITED STATES PATENT AND TRADEMARK OFFICE
CERTIFICATE OF CORRECTION

PATENT NO. : 9,599,008 B2  
APPLICATION NO. : 14/760029  
DATED : March 21, 2017  
INVENTOR(S) : Joseph E. Callahan Page 1 of 1

It is certified that error appears in the above-identified patent and that said Letters Patent is hereby corrected as shown below:

In the Claims

In Claim 1, Column 4, Line 34; after "within a" replace "grooved" with --groove--

In Claim 8, Column 4, Line 59; after "combination of" replace "a" with --at--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*